May 20, 1958

D. BERLIN 2,835,500

COLLAPSIBLE SHOPPING CART

Filed May 3, 1956

INVENTOR.
DENNIS BERLIN
BY
Harry Sangram

United States Patent Office 2,835,500
Patented May 20, 1958

2,835,500

COLLAPSIBLE SHOPPING CART

Dennis Berlin, Philadelphia, Pa.

Application May 3, 1956, Serial No. 582,582

2 Claims. (Cl. 280—36)

My invention relates to a collapsible cart and more particularly relates to a collapsible shopping cart commonly used to receive, store and transport articles or parcels during marketing or similar activities.

In the present day mode of living, with small apartments or houses in which storage space is at a premium, it has become increasingly necessary to use compact, convertible and collapsible devices, whereby one device may do the work of several. Furthermore, when such a device is not in use at all, it is desirable for it to have the capacity to be callapsed or folded into a small compact unit which will occupy but a small storage space. With the advent of suburban living and widely separated shopping centers, it is the custom for the shopper to bring along a shopping cart which may conveniently be carried in an automobile to the market center. These shopping carts must of necessity be sturdy in construction and of large capacity in order to accommodate a considerable volume of parcels which are purchased in the various stores within the center and transported therebetween during the shopping tour.

While numerous carts of this nature have been previously manufactured, such carts have been found to be wanting because their complicity of structure which makes manufacture expensive or because of their intricate folding construction presenting problems to the user.

Although it is primarily for shopping use that the present invention has been designed, the device may just as well be used for many other purposes in its original state, and may easily be converted to serve further uses when desired.

It is, therefore, an object of my invention to provide a sturdy shopping cart which may easily be collapsed into a small storage space.

Another object of my invention is to construct a collapsible shopping cart whose arrangement of parts are such as to provide for ease of economical manufacture, requiring a minimum of welded components, and which is adapted for large scale production.

Another object of my invention is to provide a collapsible shopping cart wherein an efficient and simple manner of folding is afforded.

Another object of my invention is to provide a collapsible shopping care which is useful for many purposes in its original state and which may easily be converted to serve additional purposes.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
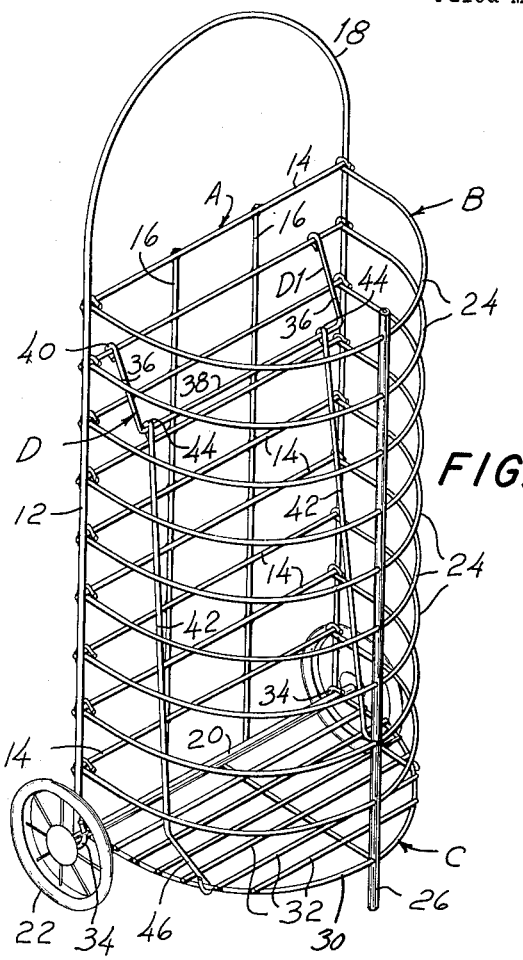
Fig. 1 is a perspective view of a collapsible shopping cart embodying my invention.
Figure 2:
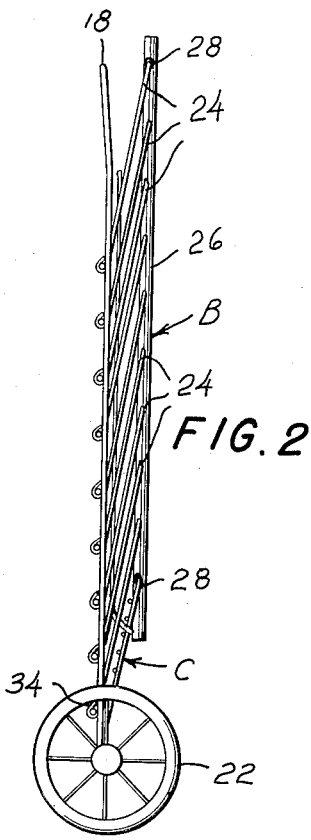
Fig. 2 is a side view of the shopping cart in collapsed position.
Figure 3:
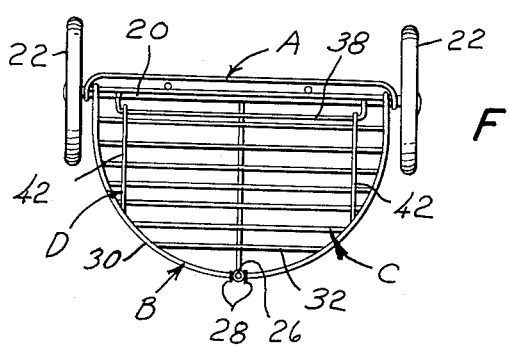
Fig. 3 is a top plan view of the cart in open position.

Referring now in greater detail to the drawing in which similar reference characters refer to similar parts, I show a collapsible cart comprising a rear reticulated section, generally designated as A, a folding forward section, generally designated as B, a reticulated bottom section, generally designated as C and a locking brace, generally designated as D.

The rear reticulated section A comprises a U-shaped wire frame 12 across which a plurality of horizontal struts 14 are secured. To provide additional support and to add further lattice structure for retaining the articles within the cart, a plurality of vertical struts 16 are affixed to the horizontal struts 14. In this regard, the rear section A as well as bottom section C are generally formed of vertically and horizontally disposed rodlike members of small diameter in spaced relationship with each other. These rodlike members may be wire or tubing suitably joined as by welding, soldering or riveting to form a reticulated or lattice-like structure.

The upper portion of the frame 12 forms a handle 18 whereby the cart may be conveniently pushed or easily hung when not in use. An axle 20 extends transversely across the lower portion of the frame and protrudes slightly beyond the edges thereof. Ground engaging wheels 22 are suitably mounted upon the axle 20 and provide means for rolling the cart about.

The folding forward section B is generally U-shaped in horizontal section and comprises a plurality of wire ribs 24 maintained in parallel spaced relation with each other. The vertical separation of the ribs 24 at their center portion is provided by pivotally securing the ribs within a series of holes extending through a vertical post 26. The free ends of the ribs 24 are looped and pivotally fastened to a respective horizontal strut 14 by loop closures 26. It will thus be seen that the forward section B is free to swing or pivot about the horizontal struts and be collapsed flat against the rear section A. Crimped washers 28 maintain the vertical post 26 secure from sliding about the periphery of the ribs 24.

The bottom section C comprises a U-shaped rod 30 having transverse grid rods 32 affixed thereto. Loops 34 at the free ends of the rod 30 encircle the axle 20 in the same manner as the ribs 24 are pivotally mounted to the struts 14. The center of the U-shaped rod 30 is pivotally mounted to the vertical post 26 whereby articulation of the bottom section with the forward section is effected. It is easily apparent that collapsing of the bottom section C against the rear section A is effected simultaneous with the forward section B.

The locking brace D includes an upper member D1 consisting of a pair of arms 36 integrally extending from a transverse bar 38. The ends of the arms 36 are looped at 40 about one of the horizontal struts 14 to define a pivotal joint. A pair of legs 42 hingedly grasp the transverse bar 38 by eyelets 44 formed at the upper portion of the legs. The lower portion of the legs are forwardly bent to define feet 46, the ends of which are looped about the U-shaped rod 30 of the bottom section C.

As is apparent from the foregoing description, the mode of collapsing the cart is as follows. The transverse bar 38 of the locking brace D is pushed forward away from the struts of the rear section A until the force of the legs 42 upon the upper member D1 is vertically upward. The brace is thereby unlocked since any forward or downward reaction thrust upon the bottom section is removed, the upper member D1 simulating a freely swinging trapeze. By pulling upward and backward upon any rib of the forward section, or on the transverse bar itself, the entire forward section will collapse into a folded and nestled position flat against the rear section. In order to place the cart in open position, the reverse procedure is employed and the ribs 24 are pushed into a position whereby they are perependicular to the plane of the rear section. The lengths of the legs of the brace D are such that the bottom section C, and consequently the ribs 24, cannot forwardly dip beyond a position parallel to the ground or floor. In this position the base of the vertical post 26 forms a tripod with the ground engaging wheels 22 when the transverse bar 38 is pulled back against the rear section. It is to be here noted that any upward thrust of the forward section is counter balanced by the reaction thrust of the locking brace legs against the rear section. In order to roll the cart about, it is simply tilted backward on the wheels and pulled or pushed along the ground.

Although my invention has been described in considerable detail, such description is intended as being illustrative rather than limiting, since the invention may be variously embodied, and the scope of the invention is to be determined as claimed.

I claim as my invention:

1. A collapsible cart comprising a rear section having a vertically disposed U-shaped wire frame and a plurality of horizontal struts secured to said frame, a center post, a plurality of spaced U-shaped ribs pivotally mounted at their intermediate portions to said post, each of said ribs having an eyelet integrally formed at each end thereof, each of said ribs engaging said rear section in fixed spaced relationship wherein each rib at the eyelets thereof pivotally engages the respective horizontal strut, an axle integral with the lower portion of said rear section and having wheel elements mounted thereon, the lowermost rib having a plurality of reticulated rods secured thereto to define a bottom, and releasable brace means permanently associated with said cart simultaneously locking each of said ribs in a plane perpendicular to said rear section, said brace means comprising a transverse rod from which a pair of integrally formed arms extend, said arms having pivotal means in operating engagement with said rear section, and a pair of legs, each being pivotally joined at one end to said transverse rod, the other end of each of said legs being pivotally connected to said bottom section, whereby disengagement of said brace means enables the simultaneous collapse of said ribs into a plane parallel and adjacent to said rear section.

2. The collapsible cart of claim 1, wherein the pivotal means of said brace means comprises an eyelet integrally formed upon each of said arms, said last mentioned eyelets being in pivotal engagement with one of said horizontal struts.

References Cited in the file of this patent

UNITED STATES PATENTS

| 957,069 | La Bauve | May 3, 1910 |
| 2,468,604 | Salat | Apr. 26, 1949 |

FOREIGN PATENTS

| 163,344 | Australia | June 15, 1955 |

UNITED STATES PATENT OFFICE

CERTIFICATE OF CORRECTION

Patent No. 2,835,500                                                        May 20, 1958

Daniel Berlin

It is hereby certified that error appears in the above numbered patent requiring correction and that the said Letters Patent should read as corrected below.

In the grant, lines 1 and 12, and in the heading to the printed specification, line 3, name of inventor, for "Dennis Berlin", each occurrence, read -- Daniel Berlin --.

Signed and sealed this 20th day of December 1960.

(SEAL)
Attest:

KARL H. AXLINE                                          ROBERT C. WATSON
Attesting Officer                                       Commissioner of Patents